Figure 1:
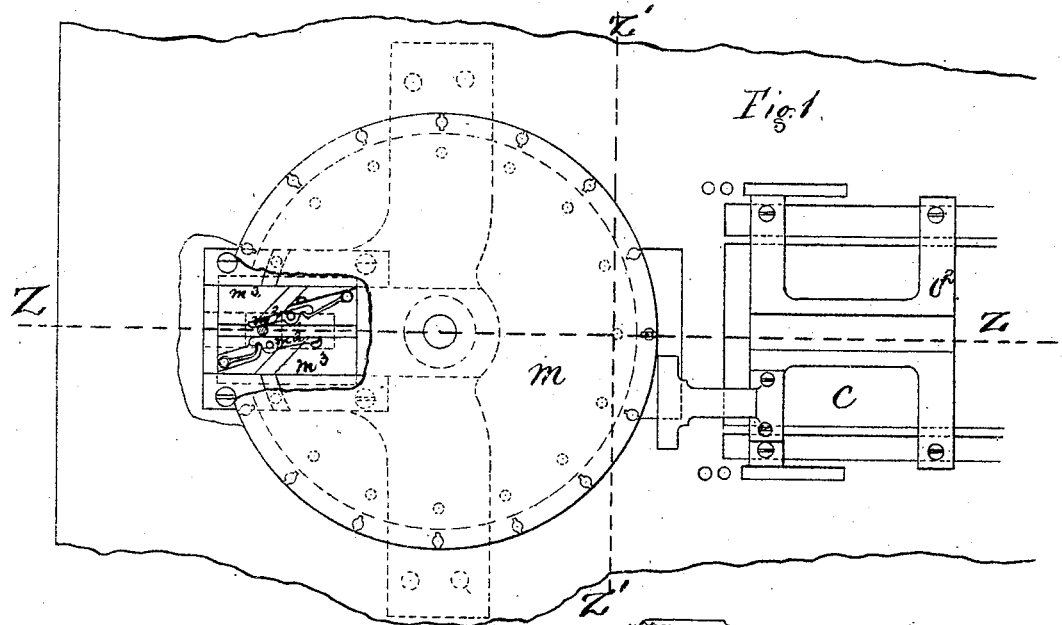

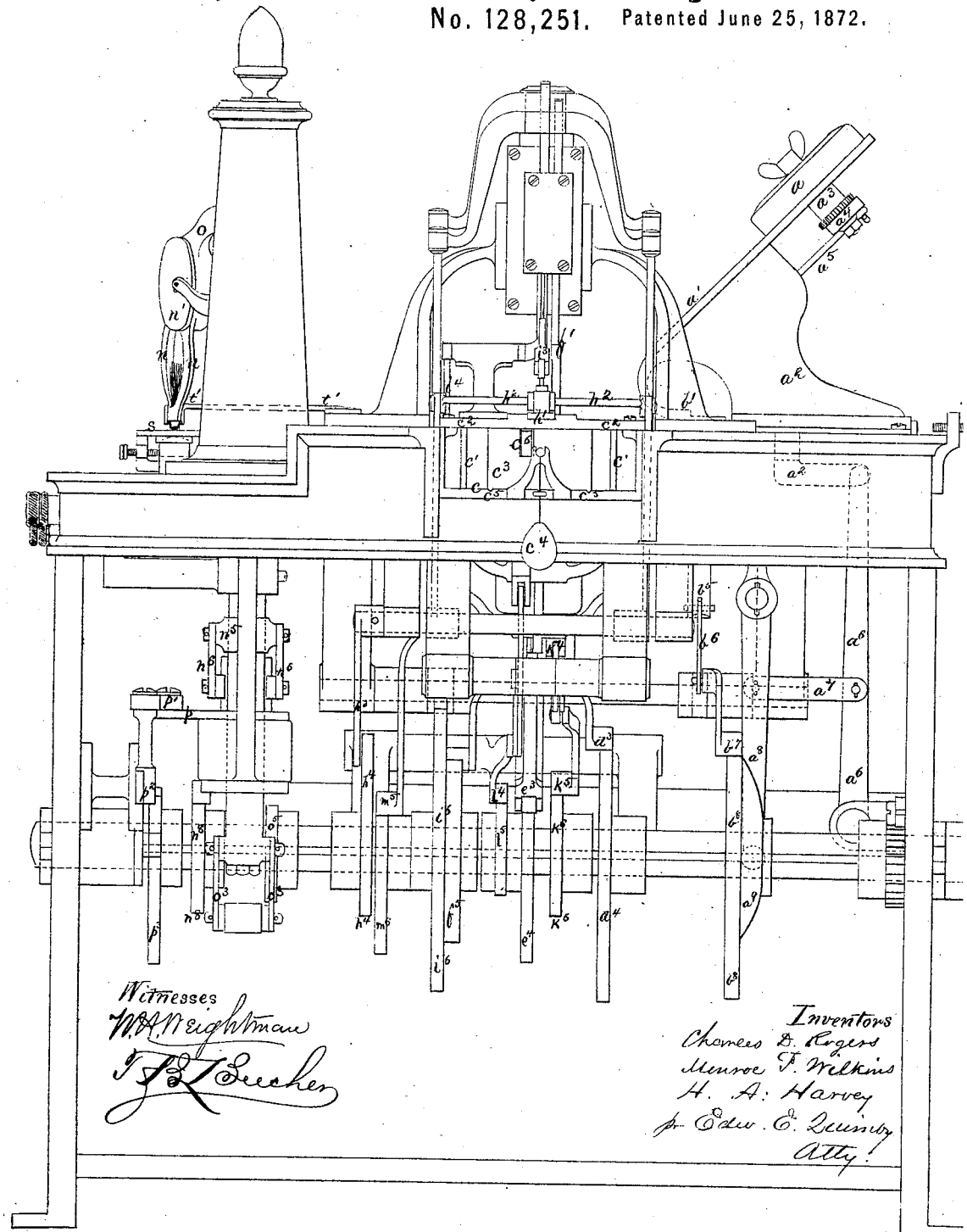

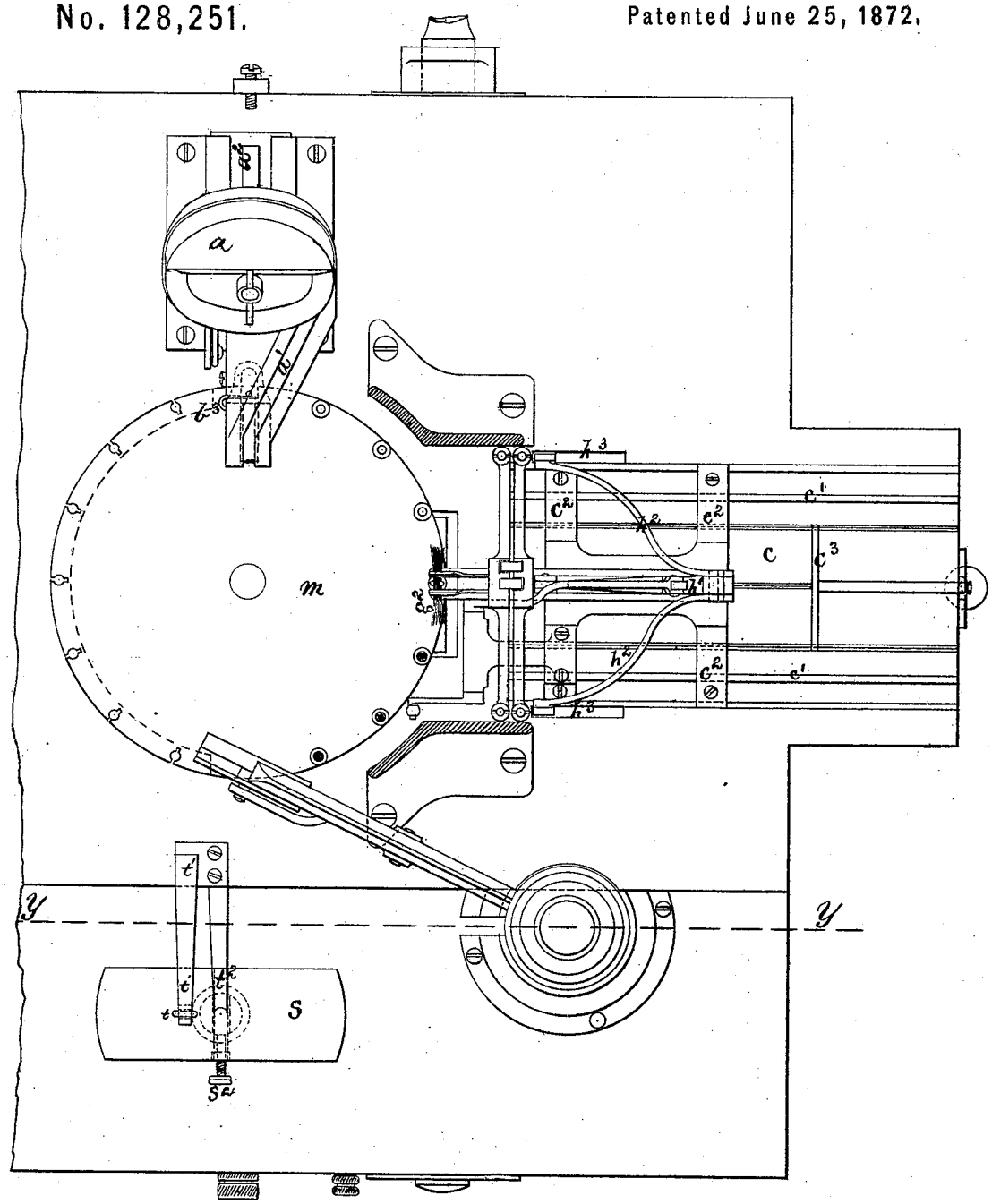

8 Sheets--Sheet 3.
C. D. ROGERS, M. P. WILKINS & H. A. HARVEY.
Improvement in Machinery for Making Brushes.
No. 128,251.  Patented June 25, 1872.
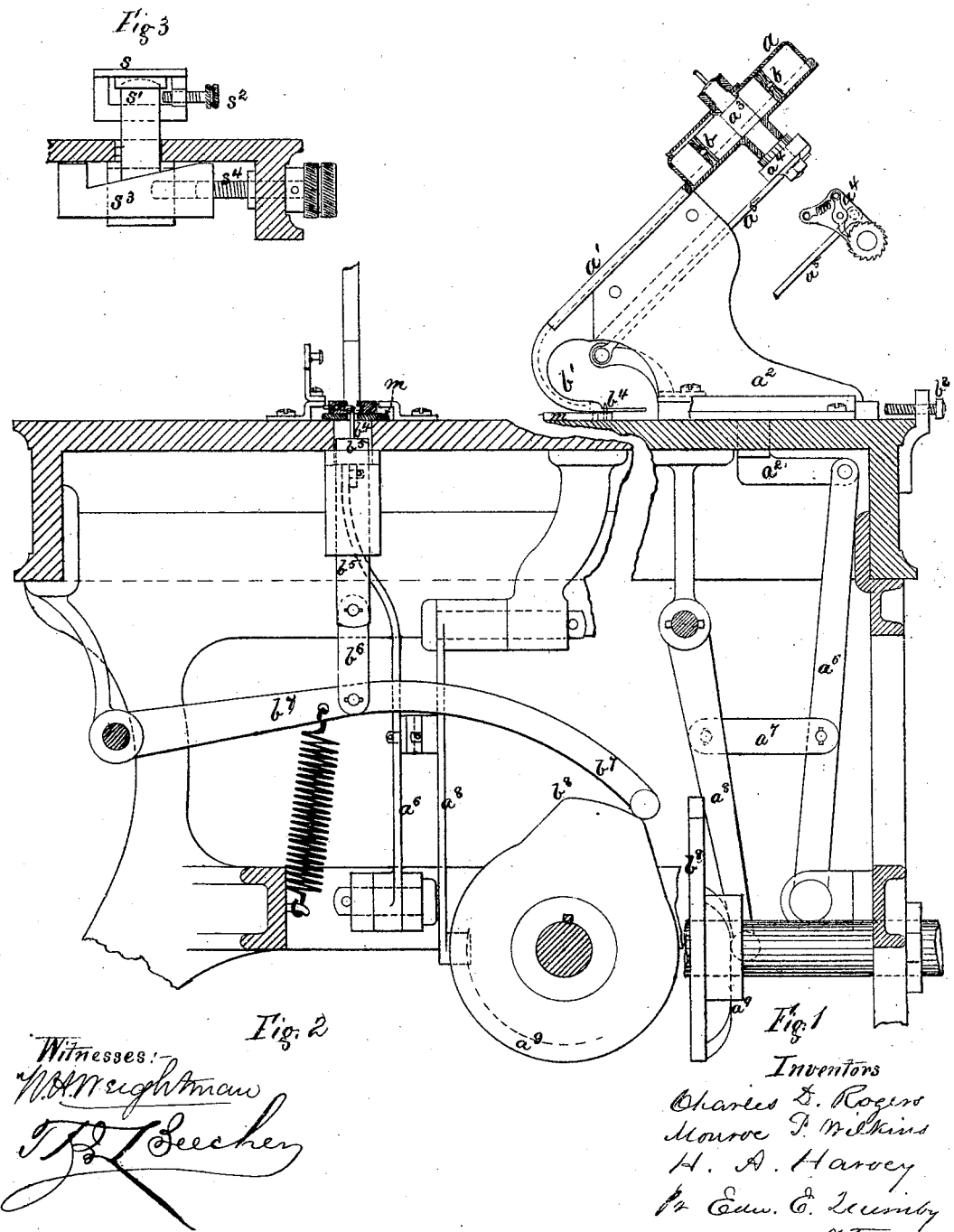

8 Sheets--Sheet 4.
C. D. ROGERS, M. P. WILKINS & H. A. HARVEY.
Improvement in Machinery for Making Brushes.
No. 128,251. Patented June 25, 1872.
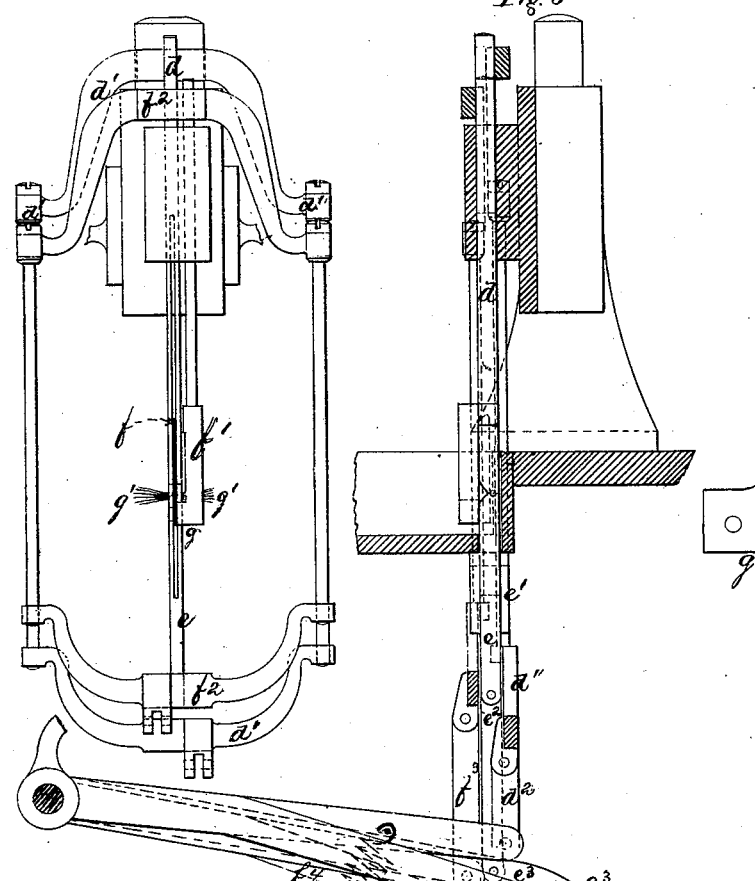

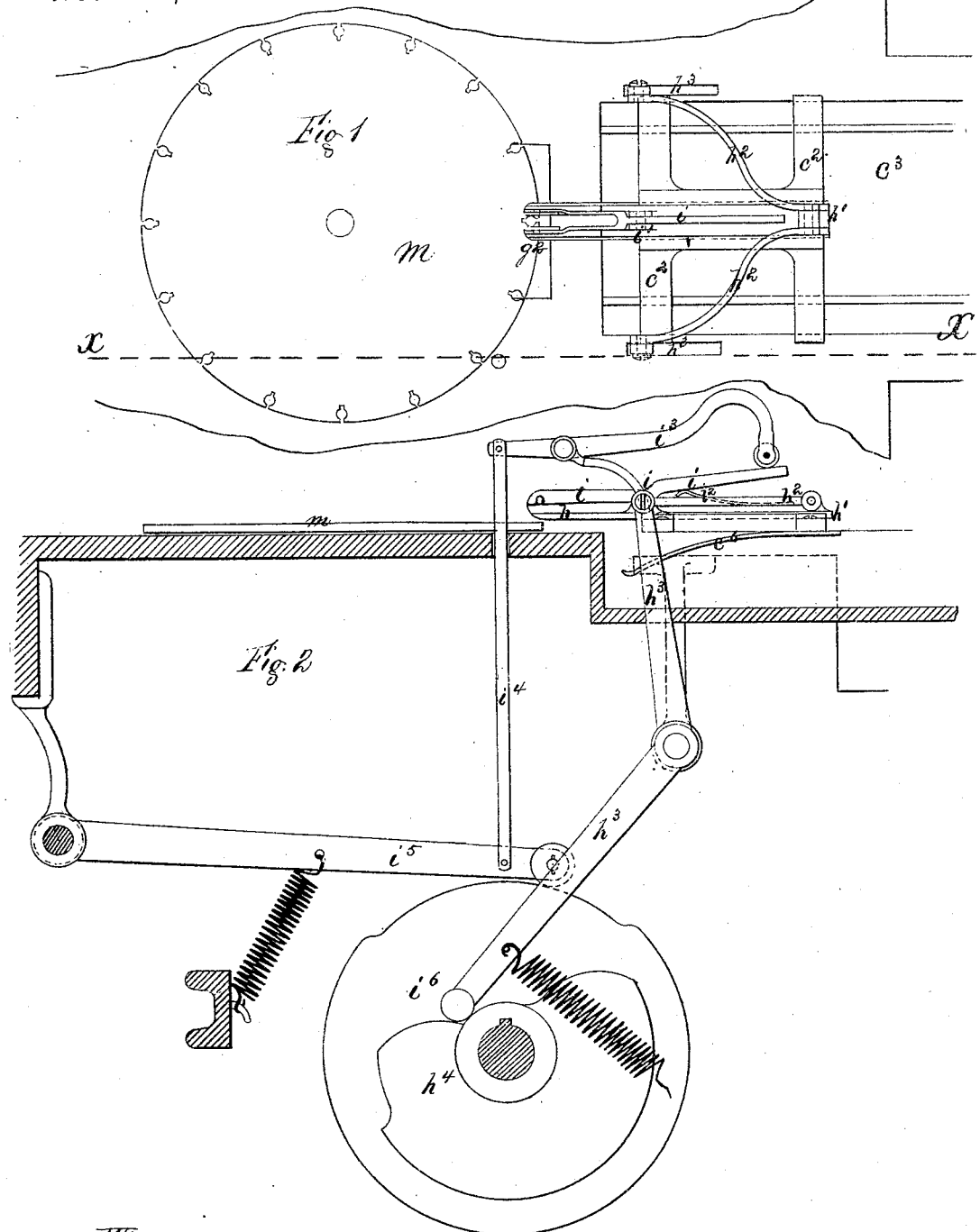

8 Sheets--Sheet 6.

C. D. ROGERS, M. P. WILKINS & H. A. HARVEY.
Improvement in Machinery for Making Brushes.

No. 128,251. Patented June 25, 1872.

Witnesses:
W. H. Weightman
T. B. Beecher

Inventors
Charles D. Rogers
Munroe P. Wilkins
H. A. Harvey
Pr. Edw. E. Quimby
Atty.

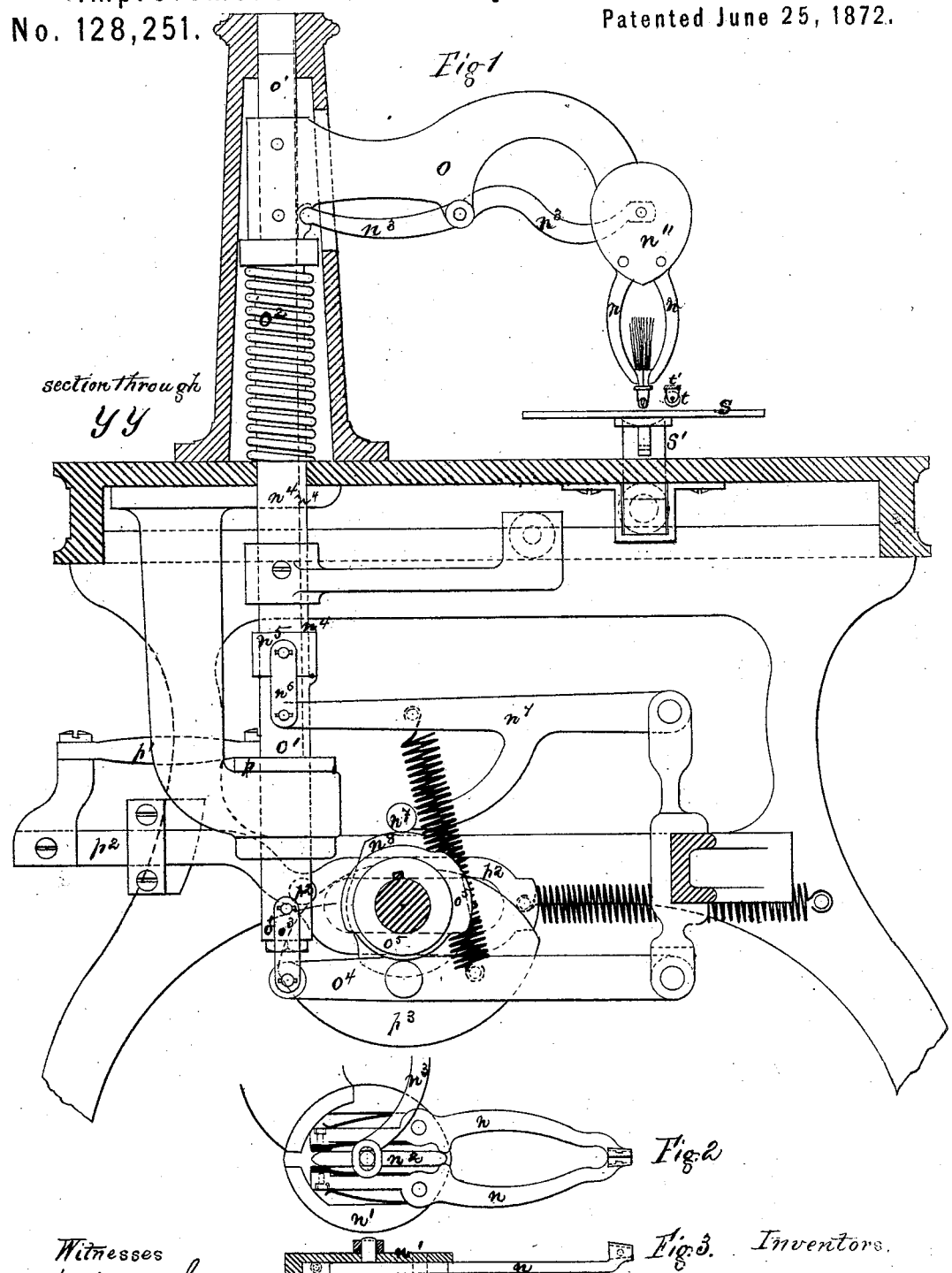

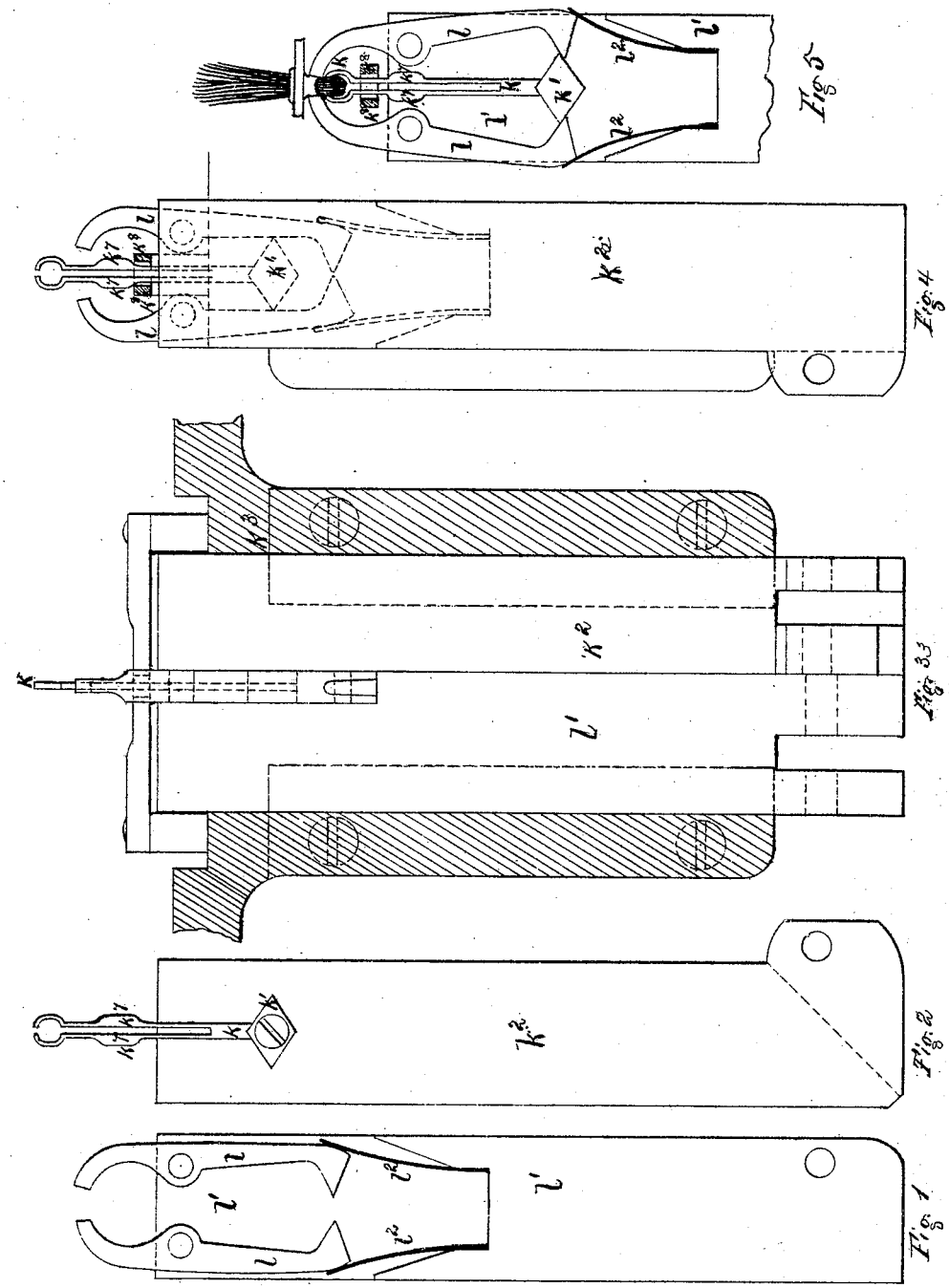

128,251

UNITED STATES PATENT OFFICE.

CHARLES D. ROGERS, OF UTICA, NEW YORK, MONROE P. WILKINS, OF JERSEY CITY, AND HAYWARD A. HARVEY, OF ORANGE, NEW JERSEY, ASSIGNORS TO MANHATTAN BRUSH-MANUFACTURING COMPANY, OF NEW YORK.

IMPROVEMENT IN MACHINERY FOR MAKING BRUSHES.

Specification forming part of Letters Patent No. 128,251, dated June 25, 1872.

We, CHARLES D. ROGERS, of Utica, New York, MONROE P. WILKINS, of Jersey City, New Jersey, and HAYWARD A. HARVEY, of Orange, New Jersey, have invented certain Improvements in Machinery for Making Brushes, of which the following is a specification:

Our improvements are embodied in a machine, by the operation of which a certain quantity of bristles or fibers is separated and detached from a mass and fastened in a ferrule or eyelet, forming what we call a "tuft," and the tufts, as they are successively formed, are firmly set into a brush-stock.

The general character of the machine is as follows, viz.: A bed of suitable size is mounted upon a substantial frame, which also supports underneath the bed a shaft carrying the several cams from which the various motions of the machine are derived. At each complete revolution of this shaft a new tuft is formed, and a tuft previously formed is inserted in a brush-stock. Above the table is a hopper for containing eyelets, which are conveyed from thence, by means of a pair of ways, down to a horizontal turn-table or revolving disk provided with a series of slotted holes, into which the eyelets are successively checked, one by one, by a reciprocating sliding movement of the hopper and ways. The hopper is provided with rotating brushes to stir up the eyelets and prevent them from jamming at the entrance to the ways, and the sliding movement of the hopper has a similar effect, which is enhanced by the jar caused by the sudden stoppage of the backward motion of the hopper by means of a set-screw, so placed as to arrest the movement when the ways are in proper position to deliver an eyelet. The turn-table rotates intermittently, and, while standing still to be supplied with an eyelet, holds another eyelet which it has previously taken in position to receive a bunch of bristles. The bristles are supplied from a mass laid crosswise in a horizontal trough between two parallel guides, which are susceptible of adjustment to conform to the length of the bristles used, and also to regulate the position of the bristles with respect to the jaws which pick out the bunches for the tufts. The mass of bristles is pushed against the jaws by the constant pressure of a weighted or spring plunger or follower. The follower is a thin plate standing vertically across the trough, and having on its lower edge short prongs or teeth, which enter corresponding grooves running longitudinally in the bottom of the trough, so as to catch under the lowermost bristles, and thus prevent the follower from riding over them. A slot in the follower admits the top guide which holds the bristles down. The picking-up jaws slide in the same vertical plane, so as to come together, end to end, immediately opposite the mass of bristles. At the point of junction they are notched out, so as to present a recess capable of holding the quantity of bristles required to make a tuft. The follower pushes bristles into the recess, and then a vertical wedge, sliding in the upper jaw, moves down and enters the lower jaw, separating the bunch of bristles from the mass, and crowding the mass back. The vertical jaws then rise together, carrying up and presenting the bunch to a pair of forked jaws, which slide forward horizontally and close upon the bunch upon each side of the vertical jaws, which latter then retire in opposite directions, and the forked jaws again move forward until they hold the bunch of bristles immediately over one of the eyelets in the turn-table. Through this eyelet a pair of spring-fingers then rise and close upon the bunch of bristles between the prongs of the forked jaws, which then open and retire. The fingers then descend, drawing the bristles into the eyelet, so that the bunch forms a loop, the eye or bight of which projects below the eyelet. While in this position a pair of pinchers rises and grasp the barrel of the eyelet just under the flange, and compress it so as to indent it into the bunch of bristles between the legs of the loop. The holes in the turn-table are slotted to admit the pinchers for the performance of this operation. Pinchers and fingers then release the eyelet and bristles and retire, and the tuft thus formed is carried onward the next time the turn-table moves. When the tuft has arrived at a point opposite the eyelet-hopper, and while the turn-table is stationary for a repetition of the operations just described, an arm swings over it, and a pair of tongs, depending downward therefrom, take hold of the tuft just above the eyelet and lift it out of the turn-table. The arm then swings back and the tongs descend and forcibly insert the tuft in a hole in a brush-stock. The brush-stock is previously prepared by the necessary boring, &c., and is held upon an adjustable platform in position to receive the tufts as they are successively presented by the tongs. The downward pressure of the tongs upon the dishing-flange of the eyelet flattens it out, and expands it into the wood of the stock, the holes therein being counterbored just large enough to admit the flanges of the eyelets before expansion.

We will now trace out the various motions of our machine with the aid of the accompanying drawing, which is as follows:

Sheet No. 1 is a front elevation of the machine with the spiral springs removed from the cam-levers in order not to obscure the view of the other parts.

Sheet No. 2 is a top view with part of the upper frame removed for the same purpose.

Figures 2, 3:
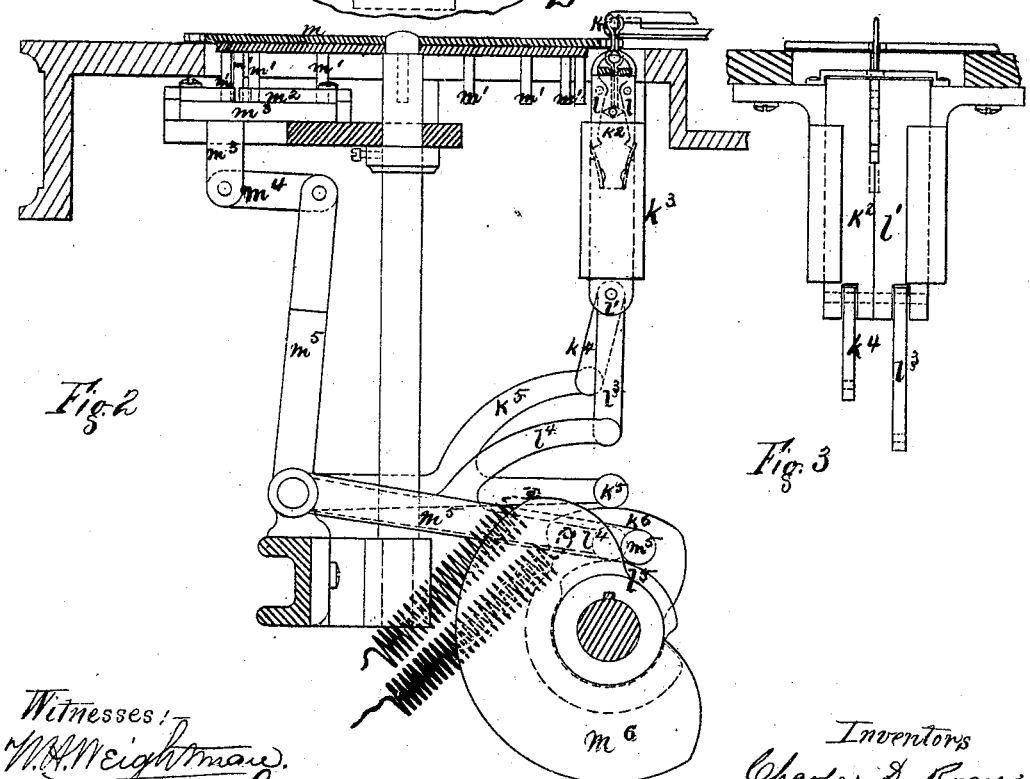

Sheet No. 3—Figures 1 and 2, vertical sections of the eyelet-hoppers, &c., and connections; and Fig. 3, section of adjustable platform.

Sheet No. 4—Figs. 1 and 2, views of the picking-up jaws, &c.; Fig. 3, their connections with the cams by which they are operated; and Fig. 4, the vertical sliding yokes in which they are carried.

Sheet No. 5—Fig. 1 is a top view of the forked jaws, showing a portion of the bed of the machine and the turn-table; and Fig. 2 is a vertical section of the same through line $x$ $x$ on Fig. 1.

Sheet No. 6—Fig. 1, top view of the turn-table, with part of the same broken out to show the device for rotating it; Fig. 2 is a vertical cross-section through line $z$ $z$ on Fig. 1; and Fig. 3 is a vertical cross-section through line $z'$ $z'$, showing the pinchers and their connections.

Sheet No. 7—Figure 1 is a vertical cross-section of the machine through line $y$ $y$ on Sheet No. 2. Fig. 2 is a detailed view of the tongs for picking up and inserting the tufts, and Fig. 3 is a vertical cross-section of a portion of the same.

Sheet No. 8 shows enlarged views of the spring-fingers and pinchers in various positions.

We will commence with the eyelet-hopper $a$. (See Sheets 1, 2, and 3.) The ways $a^1$ lead from the hopper to the turn-table, and hopper and ways are supported upon the reciprocating slide $a^2$. The shell of the hopper is mounted on the shaft $a^3$, on the lower end of which is a ratchet-wheel which is impelled by means of a pawl upon the swinging plate $a^4$. This plate being connected with a stationary point on the table or bed of the machine by the rod $a^5$ swings back and forth when the hopper makes its reciprocal motion. The hopper, &c., derives reciprocal motion through the lever $a^6$, link $a^7$, and lever $a^8$, from the face-cam $a^9$. The inner circumference of the hopper-shell is provided with several brushes, $b$ $b$, Sheet 3, which rotate with the shell and push the eyelets into the ways or away from the entrance to the ways if any should be there which are not in proper position. The eyelets must lie flange downward, in order to enter the ways. Having entered, they are carried down by gravity and pass around the curve in the ways at $b^1$, so that they then stand flange upward. The motion of the hopper and ways outward from the center of the machine is stopped by the set-screw $b^2$, which regulates the position of the ways, so that an eyelet will stand immediately over one of the holes in the turn-table $m$. The column or row of eyelets is arrested at the foot of the ways by a light spring, $b^3$, Sheet 2, so that when the ways stop the eyelet at the end of the row, being held back by the spring, is in the desired position. A pin, $b^4$, then rises through the hole in the turn-table $m$ and entering the eyelet holds it while the ways slide back, and then drops down so as to deposit the eyelet in the hole in the turn-table. This pin is secured to a slide piece, $b^5$, and is operated through the link $b^6$ and lever $b^7$ by the periphery $b^8$ of the cam $a^9$.

The rotation of the turn-table, by means of which the eyelet is conveyed to the place where the bristles are inserted, will be explained hereafter, and we will now describe the mechanism for dealing with the bristles forming the tufts, &c.

The bristle-trough $c$ has movable sides $c^1$ $c^1$, which are parallel guides placed a distance apart, equal to the length of the bristles, and held in position by the frictional bearing upon them of the jaw-frame $c^2$. By altering the position of the guides $c^1$ $c^1$ the bristles may be held so that the picking-up jaws will seize them either in the middle or on one side of the middle, if, as is sometimes the case, it is desired so to do. In the trough is a plunger, $c^3$, which follows up the mass of bristles, being impelled by a weight, $c^4$, applied to the stem of the plunger. The follower has prongs or teeth on its lower edge, traveling in longitudinal grooves $c^5$ in the bed of the trough, so as to catch under the lowermost bristles in the trough. A slot in the follower admits the top guide $c^6$, which holds the mass of bristles down in front of the follower, and is attached to the jaw-frame $c^2$. The picking-up jaws are vertical slide pieces, meeting end to end, and are notched and beveled at the ends, as shown in Fig. 1, Sheet No. 4. The upper jaw $d$ is carried in the yoke $d^1$, which is moved up and down through the link $d^2$ and forked lever $d^3$ by the cam $d^4$. The lower jaw $e$ slides in a guide, $e^1$, secured to the bed of the machine, and derives its movement through the link $e^2$ and lever $e^3$ from the cam $e^4$. A vertical groove in the jaws admits the thin plate $f$, which is beveled at its lower end, and which has the double purpose of pushing back the mass of bristles in its downward movement, and also of holding in the bristles which have entered the jaws. This, which we call the separator, is attached to the arm $f^1$, which is carried in the yoke $f^2$, deriving its motion through the link $f^3$ and forked lever $f^4$ from the cam $f^5$. These cams are timed, so that when the jaws have received a supply of bristles the cam $f^5$ allows the lever $f^4$ to drop, which brings the separator down to the position indicated at $g$, Fig. 1, Sheet 4. A bunch of bristles is shown in the jaws at $g^1$, Fig. 4, Sheet 4. Then the cams $d^4$ and $e^4$ raise the levers $d^3$ and $e^3$ simultaneously, thus moving up the jaws and contained bristles to the level of the forked jaws, which slide horizontally forward and grasp the bunch of bristles on each side of the vertical jaws. The cam $e^4$ then allows the lever $e^3$ to drop, lowering the jaw $e$, and, at the same time, the cam $d^4$ raises the lever $d^3$ a little higher, and thus takes the upper jaw out of way of the forked jaws; coincidently with the latter movement the cam $f^5$ raises the lever $f^4$, carrying the separator up out of the way, keeping the path clear for the horizontal jaws to perform their office, after which the vertical jaws, &c., again assume the position indicated on Sheet 4, ready to repeat their operations. The horizontal jaws consists of two forked pieces; the lower one, $h$, is secured to the slide carriage $h^1$, which has an interrupted reciprocal movement in a groove in the cross-frame $c^2$, derived through the crooked links $h^2$ $h^2$ and levers $h^3$ $h^3$ from the cam $h^4$. (See Sheet 5.) The upper jaw $i$ rocks upon the journal $i^1$, which is secured to the lower jaw. The upper jaw is held down upon the lower jaw by the effect of the spring $i^2$, Fig. 2, Sheet 5, except when it is held up by the pressure upon the opposite end of the roller in the end of the bent lever $i^3$, to which motion is imparted through the link $i^4$ and lever $i^5$ by the cam $i^6$. These cams are timed so that the jaws stand open when sliding forward to take hold of the bristles $g^1$, then close upon the bristles; the sliding movement being arrested to enable them so to do, and resumed immediately afterward, so that the bristles may be carried forward and held over the eyelet in the turn-table in the position indicated on Sheets 2 and 5 at $g^2$. While in this position the bristles, which we shall hereafter speak of as the "tuft," are seized by a pair of spring-fingers, which rise up through the eyelet for that purpose, and then the horizontal jaws open and slide back out of the way. The spring-fingers $k$ are attached to the diamond-shaped toe $k^1$, (see Sheet 8,) which is secured to the piece $k^2$, which slides vertically in the box $k^3$, and is actuated, through the link $k^4$ and forked lever $k^5$, by the cam $k^6$. (See Sheet No. 6.) The fingers are made to spring open, but are each enlarged on the shank by the lips $k^7$ $k^7$, which close the fingers by striking against the stops $k^8$ $k^8$, when the fingers are drawn down in the act of looping the tuft through the eyelet. After this has been effected, and just prior to the conclusion of the downward motion of the slide $k^2$, carrying the fingers $k$, &c., the toe $k^1$ strikes against and opens the lower ends of the pinchers $l$ $l$, thus closing the jaws of the pinchers upon that part of the barrel of the eyelet just beneath the flange, and causing them to compress or indent two points on opposite sides of the periphery of the eyelet into the middle of the tuft between the legs of the loop of bristles. The fingers then unclose from the loop and the pinchers let go of the eyelet, and both pinchers and fingers drop down to allow the tuft to pass on by the rotation of the turn-table. The pinchers are pivoted on the slide-piece $l^1$, and are held open by the springs $l^2$ $l^2$. The stops $k^3$ $k^3$ are attached to the frame of the machine. The slide-piece $l^1$ acquires its motion through the link $l^3$ and forked lever $l^4$ from the cam $l^5$. The combined action of the turn-table as a holder of the eyelet and the pinchers as compressors of the eyelet, and the combined action of either one or both of these parts with the fingers for drawing into the eyelet the loop of bristles, constitute important features of our invention. The turn-table $m$ is the conveyer, first, of eyelets to the bristle-jaws, and then of the tufts to the place where they are delivered to the inserting-tongs. Its rotation is effected by the pins $m^1$ $m^1$, &c., being successively caught in the switches $m^2$ $m^2$, the latter being carried in the reciprocating sliding bed $m^3$, which is moved through link $m^4$ and elbow $m^5$ by the cam $m^6$. The eyelet-holes in the turn-table are slotted across to admit of the entrance of the pinchers when they rise to indent the eyelet. The inserting-tongs $n$ $n$ are pivoted to the shell $n^1$ at the extremity of the swinging arm $o$, and are opened and closed by the vertical movement of the double-ended wedge $n^2$, (see Fig. 2, Sheet 7.) This wedge is moved up and down through the lever $n^3$, sliding key $n^4$, sleeve $n^5$, links $n^6$, and forked lever $n^7$ by the cam $n^8$. The arm $o$ is secured to the vertical sliding and rocking shaft $o^1$, which is pushed up by the spring $o^2$ and depressed through the links $o^3$ and lever $o^4$ by the cam $o^5$. The rocking motion is imparted by means of the crank $p$, actuated through the link $p^1$ and slide-bar $p^2$ by the cam $p^3$, (see Sheets 1 and 7.) The tongs, which are previously open, close upon the tuft standing in the turn-table and maintain a firm hold of it just above the flange of the eyelet until the arm $o$, &c., rises and swings around and then drops and inserts the tuft in the hole in the brush-stock immediately over the center bearing of the adjustable platform $s$. This platform, (see Fig. 3, Sheet 3,) is in the nature of a rolling bed and rocks upon the rounded end of the standard $s^1$, but may be stayed in position by the set-screw $s^2$. It is susceptible of adjustment in height by means of the wedge $s^3$, which is operated by the draw-screw $s^4$. A small roller, $t$, is supported in the end of the arm $t^1$, which is secured to the bed of the machine. This roller travels upon the surface of the brush-stock, and is placed so as to drop into one of the holes therein, and thus act as a guide to the placing of the next preceding hole immediately under the tongs. Another mode of indicating the position for the brush-stock to occupy for the reception of the tuft is by the use of the pointer or guide $t^2$, which is fastened to the bed of the machine so as to project over the brush-block and point to the place where the tuft will be presented by the tongs.

We claim as our invention the following devices and combinations of devices, substantially as described, and for the purposes set forth:

1. The reciprocating sliding ways $a^1$ and hopper $a$, in combination with the turn-table $m$, for checking eyelets into the turn-table.

2. The combination of adjustable guides $c^1$ $c^1$ in a bristle-trough, with jaws $d$ and $e$ for seizing or picking up bunches of bristles.

3. The combination of prongs or teeth on the lower edge of the follower $c^3$, with corresponding grooves $c^5$ in the bed of the bristle-trough $c$.

4. The combination of the follower or plunger $c^3$ with the picking-up jaws $d$ and $e$.

5. The combination of the top guide $c^6$, for holding the mass of bristles down, with the follower or plunger $c^3$ and jaws $d$ and $e$.

6. The combination of the picking-up jaws $d$ and $e$ with the bristle-trough $c$.

7. The combination of the picking-up jaws $d$ and $e$ with the forked jaws $h$ and $i$ for delivering the bunch of bristles to the fingers $k$, which draw or loop the bristles through the eyelet.

8. The combination of the forked jaws $h$ and $i$ with the looping-fingers $k$, operating through the slotted openings in the turn-table $m$.

9. The combination of the looping-fingers $k$ with the eyelet-holder.

10. The combination of the pinchers $l\ l$ with the eyelet-holder and also with the looping-fingers $k$.

11. The combination of the turn-table $m$ as an eyelet-holder and a conveyer, with the eyelet-ways $a^1$ and the jaws $d$ and $e$ and $h$ and $i$ for picking up and presenting bunches of bristles.

12. The combination of the turn-table $m$ with the inserting-tongs $n\ n$.

13. The combination of the turn-table $m$ as an eyelet-holder and a conveyer with the inserting-tongs $n\ n$, the picking-up jaws $d$ and $e$, and the forked jaws $h$ and $i$.

14. The combination of the turn-table $m$ as an eyelet-holder and a conveyer, with the eyelet-ways $b^1$, the devices for separating and forming bunches of bristles into tufts and the inserting-tongs $n\ n$.

15. The swinging arm $o$, carrying the inserting-tongs $n\ n$, having motions up and down for accomplishing the purpose of picking up the tufts and afterward setting them into the brush-block, and also the swinging motion for carrying the tongs from the turn-table to the brush-block.

16. The inserting-tongs $n\ n$, having the combined functions of griping the outside of the tuft and of setting or expanding the eyelet-flange into the brush-stock.

17. The combination of griping and setting-tongs $n\ n$ with the adjustable platform $s$ for supporting the brush-stock.

18. A roller, $t$, or pointer $t^2$, for indicating the position in which the brush-stock is to be held to receive a tuft by means of the holes in the brush-stock.

CHAS. D. ROGERS.
      M. P. WILKINS.
      H. A. HARVEY.

Witnesses as to C. D. ROGERS:
 JAMES A. NEALEY,
 S. E. THOMAS.

Witnesses as to MONROE P. WILKINS:
 ORSAMUS BUSHNILL,
 LOUIS FELLOWS.

Witnesses as to H. A. HARVEY:
 J. K. LASELL,
 F. M. QUIMLY.